No. 652,115. Patented June 19, 1900.
T. D. JAMES.
BALING PRESS.
(Application filed Nov. 6, 1899.)
(No Model.) 2 Sheets—Sheet 1.
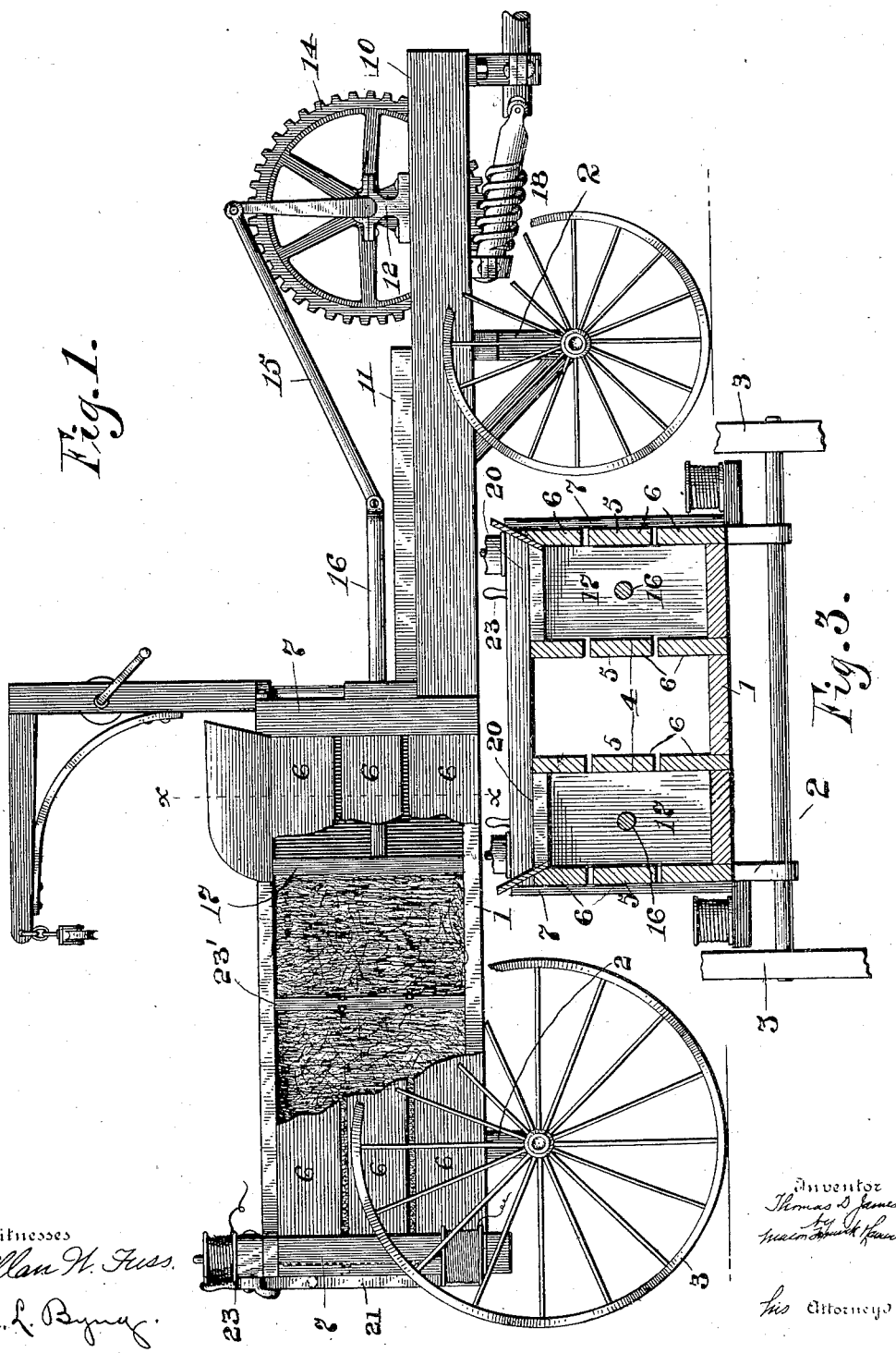

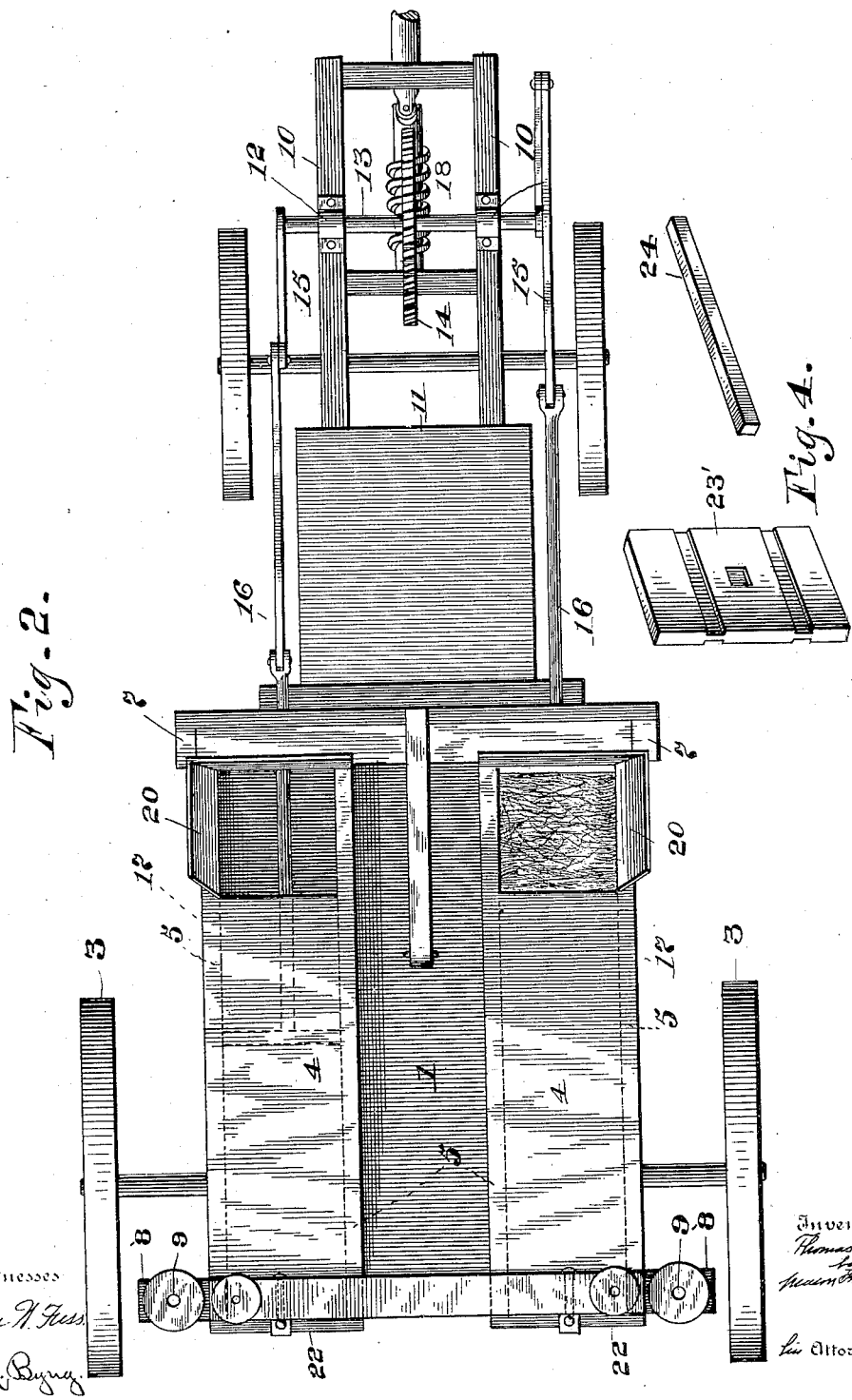

UNITED STATES PATENT OFFICE.

THOMAS D. JAMES, OF HUMBOLDT, TENNESSEE, ASSIGNOR OF ONE-HALF TO RICHARD T. DE BERRY, OF SAME PLACE.

BALING-PRESS.

SPECIFICATION forming part of Letters Patent No. 652,115, dated June 19, 1900.

Application filed November 6, 1899. Serial No. 736,015. (No model.)

*To all whom it may concern:*

Be it known that I, THOMAS D. JAMES, a citizen of the United States, residing at Humboldt, in the county of Gibson and State of Tennessee, have invented certain new and useful Improvements in Baling-Presses; and I do hereby declare the following to be a full, clear, and exact description of the invention, such as will enable others skilled in the art to which it appertains to make and use the same.

My invention relates to improvements in presses for pressing and baling hay, and especially to that type of presses which employ two alternately-reciprocating plungers which operate in pressing and baling boxes; and the invention consists in certain novel constructions, combinations, and arrangements of parts, as will be hereinafter described and specifically claimed.

One object of my invention is the production of a baling-press which can be conveniently transported from one farm to another and which is designed to carry the motor for operating the same, which may consist of a ground-power, a tread-power, or an engine.

Another object of my invention is the employment of the wiring and spacing blocks and auxiliary pressure-rods whereby a small compact bale can be formed when there is not sufficient hay or other material to make a full-sized bale.

In the accompanying drawings, Figure 1 is a side elevation, partly in section, of a baling-press made in accordance with my invention. Fig. 2 is a top plan view of the same. Fig. 3 is a transverse section on the line $xx$ of Fig. 1, and Fig. 4 is a detail perspective view of one of the spacing and wiring blocks and one of the auxiliary pressure-rods.

My improved baling-press consists of a suitable bottom or floor 1, which is supported on suitable running-gear 2 3. Supported on the platform or base 1 are two longitudinally-arranged baling boxes or housings 4, with a longitudinal space between them which furnishes standing and operating room for the attendant or attendants. These baling or pressing boxes are provided with inclosing sides 5 5, formed with slats 6 6, with longitudinal spaces between them for the insertion of the wire for tying a pressed bale. This framework is strengthened by the use of end posts 7 7, which are secured to the said slats and also to the other framework of the press. Extending laterally from the baling-boxes, at the rear ends thereof, are supports 8 8, carrying spindles 9 9, on which bobbins or spools containing wire are placed. Extending forwardly of the pressing and baling boxes is a strong framework or support consisting of longitudinal beams 10 10, suitably strengthened transversely. On top of these beams is secured a platform 11, which is designed to support the motive power either permanently or only when the press is being transported from one place to another. Mounted on top of the longitudinal beams 10 10 and forward of the platform 11 are bearing-boxes 12, in which a shaft 13, carrying a gear-wheel 14, is mounted. This shaft 13 is provided at each end with a crank, to which are connected pitmen 15 15, said pitmen being connected at their rear ends to plunger-rods 16. The plunger-rods are provided at their rear or inner ends with heads 17, which about fill the space in the interior of the pressing and baling boxes. For operating the gear-wheel 14 I employ a worm-gear, as 18, which is very important in this class of presses, for the reason that it is very positive and powerful in its action and can be operated effectually in either direction, when desired, and which cannot be accidentally forced backward by the back pressure of the hay or other material being baled. The movement is also sufficiently slow to permit one attendant to feed the hay or other material to both pressing and baling boxes. It is important to employ worm or equivalent gearing which can be operated effectually in either direction, for the reason that when a horse or ground power is employed the travel of the horse can be reversed, which not only rests the horse, but secures a uniform wear on the harness and prevents the horse being rubbed or injured on one side, as is the case where the gearing is such as to necessitate the horse always traveling in one direction.

Where the motive power, such as a portable steam or like engine, is supported on the platform 11, it will be suitably connected by belting or gearing with a shaft on the end of the worm-gear to operate the same. Where a horse or tread power is employed, it will also be suitably connected with the shaft of the worm-gear. If desired, I may employ a traction-engine, which can be used to transport the press from one place to another, and when the destination is reached can be connected up with the gearing to operate the same. When a horse or tread power is employed, it is raised and placed upon the platform 11 before the start is made for another place by means of the derrick 19.

The pressing and baling boxes 4 are provided on top at or near the front ends with openings 20 20, forming hoppers for the insertion of the hay or other material to be pressed and baled, which openings may be provided with suitable doors or covers. The rear ends of the baling-boxes are provided with outwardly-opening doors 22, which latter are preferably hinged at their lower edges and secured in position at their upper edges by suitable fastenings, preferably pivoted latches 23. By pivoting the doors at their lower edges and having them open outwardly a support is formed for the completed bales as they are forced out of the press by the new bales being formed as they are pressed forward by the plungers.

In Fig. 4 I have shown a form of spacing and wiring block which forms a part of my invention. I will describe the operation of forming a bale in one box, which will be the same as that performed in the other box. One of the spacing and wiring blocks 23 is first placed in the box next to the door 22 and the door closed and locked. The press is then set in motion, and as the plunger advances the hay which has been placed in the box through the hopper 20 is forced forward, and this operation is continued until a sufficient amount of hay has been fed in to complete a bale. When this has been accomplished, another spacing-block 23 is placed next to the hay, and as the plunger moves forward to press more hay to form another bale the wire is unreeled from the spools and passed through the longitudinal openings 6 6 at points just in front of the wiring and spacing block next to the door. The two strands of wire are then carried forward and again passed through the longitudinal spaces 6 6 and in line with the grooves in the spacing-block at the forward end of the bale and then around to the point of starting, where it is twisted upon itself and the wire cut off from the spool, which wiring can be very rapidly accomplished and can be done while the bale is in a tightly-pressed condition, so that when the pressure is released the action of the hay seeking to expand will only more tightly secure the wires in position and hold the same around the bale. As soon as the bale has been wired the latch on the door is turned up and the door opened and the bale forced out by the repeated forward movement of the plunger and the continued supply of new hay in front of the same to be pressed and baled. As soon as the bale has been entirely ejected the door is again closed and locked with a new spacing and wiring block next to the same, as above explained. This operation is continued until the entire crop is baled. As heretofore explained, the gearing operates sufficiently slow to permit an attendant to supply both baling-boxes with hay or other material, so that both boxes can be operating simultaneously and continuously. When a crop has been baled and it is found that there is not sufficient hay in the press to make a full-sized bale and it is desired to give the owner all the hay coming to him, I employ auxiliary pressure-rods 24, which latter are employed as follows: One end of the rod is placed against the plunger-head, and when the plunger-head goes forward it forces the other end of the rod in contact with the spacing and wiring block next to the forward portion of the hay being pressed, by which construction and arrangement the hay which is not sufficient for a full-sized bale can be pressed into a small and compact space, and while being pressed into such position the wires can be passed around the same and secured in position, as above described.

Upon an inspection of Fig. 4 it will be seen that the wiring-blocks 23 are provided with two horizontal grooves on both their faces. The utility of this is that either face of the block can be placed against the hay, which facilitates placing them in the baling-boxes and avoids liability of the same being placed in the wrong way. This construction will be found very convenient and important, for the reason that if the blocks were only provided with the grooves on one face and they should be accidentally placed in the boxes with the grooves away from the hay it would be impossible to wire the hay when under pressure, and it would be a great inconvenience to get the blocks out after they had been placed in the boxes and hay pressed against the same.

Having now described my invention, what I claim as new, and desire to secure by Letters Patent, is—

1. In a baling-press comprising a suitable baling-chamber, a plunger therein, a plunger-rod therefor adapted to be actuated by suitable power, spacing or wiring blocks in the chamber, and an auxiliary pressure-rod applied between the plunger and wiring-block, all the parts being combined and arranged, substantially as described.

2. A press of the character described, comprising two baling-chambers having longitudinal wiring-slots in their sides, hoppers at the forward ends of said chambers, outwardly-opening doors at the rear ends of said chambers, plungers operating alternately back and forth in said chambers, spacing and wiring blocks arranged in said chambers and an auxiliary pressure-rod applied between the plunger-head and the wiring-block to press the material into a small bale, substantially as set forth.

In testimony whereof I hereunto affix my signature in presence of two witnesses.

THOMAS D. JAMES.

Witnesses:
W. B. JORDAN,
JOHN T. BROWN.